(12) United States Patent
Ying et al.

(10) Patent No.: US 8,398,931 B2
(45) Date of Patent: Mar. 19, 2013

(54) RECIRCULATING REACTOR

(75) Inventors: Jackie Y. Ying, Singapore (SG); Su Seong Lee, Singapore (SG); Jaehong Lim, Singapore (SG); Siti Nurhanna binte Riduan, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 12/875,737

(22) Filed: Sep. 3, 2010

(65) Prior Publication Data
US 2011/0015402 A1 Jan. 20, 2011

Related U.S. Application Data

(62) Division of application No. 11/504,966, filed on Aug. 16, 2006, now abandoned.

(51) Int. Cl.
*B01J 8/00* (2006.01)
*B01J 8/06* (2006.01)

(52) U.S. Cl. ........ 422/234; 422/211; 422/212; 422/217; 422/312

(58) Field of Classification Search .......... 422/211, 422/212, 217, 234, 312
See application file for complete search history.

(56) References Cited

U.S. PATENT DOCUMENTS

| | | | |
|---|---|---|---|
| 2,728,755 A | 12/1955 | Weisemann | |
| 3,275,545 A * | 9/1966 | McCall | 208/27 |
| 5,324,853 A | 6/1994 | Jones et al. | |
| 5,472,875 A * | 12/1995 | Monticello | 435/282 |
| 5,939,589 A * | 8/1999 | Kaibel et al. | 568/568 |
| 6,162,951 A * | 12/2000 | Polywka et al. | 568/13 |
| 6,544,923 B1 | 4/2003 | Ying et al. | |
| 6,646,135 B1 | 11/2003 | Baiker et al. | |
| 6,797,243 B2 | 9/2004 | Arcuri et al. | |
| 2005/0154225 A1 | 7/2005 | Proctor et al. | |

OTHER PUBLICATIONS

Kingsbury, J.S. et al. 2001 "Immobilization of olefin metathesis catalysts on monolithic sol-gel: practical, efficient, and easily recyclable catalysts for organic and combinatorial synthesis" *Angew Chem Int Ed* 40:4251-4256.
Künzle, N et al. 2003 "Continuous enantioselective hydrogenation in fixed-bed reactor: towards process intensification" *Catalysis Today* 79:503-509.
Mandoli, A et al. 2004 "Insoluble polystyrene-bound bis(oxazoline): batch and continuous-flow heterogenous enantioselective glyoxylate-ene reaction" *Tetrahedron: Asymetry* 15:3233-3244.
Sandee, AJ et al. 2001 "Solid-phase synthesis of homogenous ruthenium catalysts on silica for the continuous asymmetric transfer hydrogenation reaction" Chem Eur J 7:1202-1208.
Schmidt-Winkel, P et al. 1999 "Mesocellular siliceous foams with uniformly sized cells and windows" *J Am Chem Soc* 121:254-255.
Werner, H et al. 2003 "Improved synthesis of aza-bis(oxazoline) ligands" *J Org Chem* 68:10166-10168.
University of Michigan Engineering Website 2012 "Packed Bed Reactors (PBRs)" on the internet at http://www.engin.umich.edu/~cre/asyLearn/bits/pbr/index.htm.
Wikipedia 2012 "Packed bed" on the internet at http://en.wikipedia.org/wiki/Packed_bed.

\* cited by examiner

*Primary Examiner* — Walter D Griffin
*Assistant Examiner* — Lessanework Seifu
(74) *Attorney, Agent, or Firm* — Knobbe Martens Olson & Bear LLP (57) ABSTRACT

The invention provides a recirculating reactor for converting a substrate to a product. The reactor comprises a reaction chamber and a recirculation system, said recirculation system comprising a separator. The reaction chamber contains a catalyst, and comprises a chamber body, a chamber inlet and a chamber outlet. The recirculation system is adapted for recirculating liquid from the chamber outlet to the chamber inlet, and the separator is used for separating a by-product from the liquid.

8 Claims, 4 Drawing Sheets

RECIRCULATING REACTOR

RELATED APPLICATION

This application is a divisional of application Ser. No. 11/504,966, filed Aug. 16, 2006, which is hereby expressly incorporated by reference in its entirety.

FIELD OF THE INVENTION

The present invention relates to a recirculating reactor and to a method for using the reactor.

BACKGROUND OF THE INVENTION

Conventionally, most asymmetric reactions involved batch processing. Flow-type reactors have numerous advantages including more on-stream time, less maintenance, less catalyst attrition and loss, more consistent product streams, and less solvent waste. Despite these benefits, there have been few accounts of continuous catalytic systems with immobilized catalysts. Some catalytic reactions are very difficult to apply to a continuous flow-type system due to reaction inhibition by side-products or gaseous by-products. In particular, gas-generating catalytic reactions are not well suited to a continuous flow reactor, as the gases give rise to disturbances in and deactivation of the catalysts. For reactions that produce side-products that inhibit the reaction kinetics, a continuous flow reactor also does not work well, giving rise to lower productivity and catalyst deactivation. These side-products and gases should be removed from the reactor quickly to achieve an efficient reaction process.

OBJECT OF THE INVENTION

It is the object of the present invention to substantially overcome or at least ameliorate one or more of the above disadvantages.

SUMMARY OF THE INVENTION

In a first aspect of the invention there is provided a recirculating reactor comprising:
- a reaction chamber containing a catalyst, said reaction chamber comprising a chamber body, a chamber inlet and a chamber outlet; and
- a recirculation system for recirculating liquid from the chamber outlet to the chamber inlet;

wherein said recirculation system comprises a separator for separating a by-product from the liquid.

The catalyst may be in a form in which it is capable of being retained in the reaction chamber. The reactor may comprise means to retain the catalyst in the reaction chamber (e.g. in the chamber body). The catalyst may be a solid catalyst or may be in some other form. The catalyst may comprise a supported catalyst. The catalyst may be a heterogeneous catalyst. It may comprise a particulate catalyst, for example a microparticulate or nanoparticulate catalyst. The catalyst may be insoluble in the liquid used in the recirculating reactor. The catalyst may be capable of catalysing reaction of a substrate to produce a product and the by-product. The reaction may optionally comprise reaction of the substrate with a reagent. The by-product may capable of inhibiting the reaction of the substrate to the product. It may for example be capable of poisoning or deactivating the catalyst or of reducing the capacity of the catalyst to produce the product. The by-product may be a gaseous by-product. The separator may be adapted to separate the gaseous by-product from the liquid. The liquid may comprise a solvent, or a carrier liquid, or it may comprise a reagent or a substrate for the reaction. It may comprise a solution, suspension, emulsion or dispersion of the substrate in a solvent or carrier liquid. Once it has passed through the reaction chamber at least once, the liquid may contain the product, and may also contain one or more of unreacted substrate, unreacted reagent and the by-product.

The recirculation system may comprise appropriate piping, tubing etc. for conveying liquid from the chamber outlet to the chamber inlet. It may comprise a pump for recirculating the liquid through the reactor. The pump may be capable of pressurising the liquid prior to the liquid entering the reaction chamber. It may be capable of causing the liquid to pass through the reaction chamber at a sufficient rate as to inhibit, decrease or minimise deactivation of the catalyst by the by-product.

The separator may comprise a degasser, in the event that the by-product is a gas. Alternatively the separator may comprise a precipitator, if the by-product is a solid, or it may comprise a selective absorber, an evaporator or some other type of device suitable for removing the by-product. The separator may comprise one or more of these devices.

The reactor may comprise an outlet port for removing at least a portion of the product from the reactor, or for removing at least a portion of the liquid from the reactor in order to obtain the product. The reactor may also comprise an addition port for adding substances, e.g. the substrate, the liquid, a reagent and/or other substances to the reactor.

In an embodiment there is provided a recirculating reactor comprising:
- a reaction chamber containing a solid catalyst, said reaction chamber comprising a chamber body, a chamber inlet and a chamber outlet; and
- a recirculation system for recirculating liquid from the chamber outlet to the chamber inlet, said recirculation system comprising a degasser;

whereby the solid catalyst is capable of catalysing reaction of a substrate to produce a product and a gas.

In another embodiment there is provided a recirculating reactor comprising:
- a reaction chamber containing a supported silica catalyst, said reaction chamber comprising a chamber body, a chamber inlet and a chamber outlet; and
- a recirculation system for recirculating liquid from the chamber outlet to the chamber inlet, said recirculation system comprising a degasser;

whereby the supported silica catalyst is capable of catalysing reaction of a substrate to produce a product and a gas.

In another embodiment there is provided a recirculating reactor comprising:
- an addition port for adding a substrate and optionally one or more of a liquid, a reagent and other substances to the reactor;
- a reaction chamber containing a supported silica catalyst, said reaction chamber comprising a chamber body, a chamber inlet and a chamber outlet, and said supported silica catalyst being capable of catalysing reaction of the substrate to produce a product and a gas;
- an outlet port for removing the product from the reactor; and
- a recirculation system for recirculating liquid from the chamber outlet to the chamber inlet, said recirculation system comprising a degasser for at least partially removing the gas from the liquid.

In a second aspect of the invention there is provided a method for converting a substrate to a product, comprising:
providing a recirculating reactor comprising a reaction chamber containing a catalyst, said reaction chamber comprising a chamber body, a chamber inlet and a chamber outlet; and a recirculation system for recirculating liquid from the chamber outlet to the chamber inlet, said recirculation system comprising a separator for separating a by-product from the liquid;
adding the substrate to the liquid in the reactor;
passing the substrate in the liquid through the reaction chamber, thereby contacting the substrate with the catalyst so as to convert at least a portion of the substrate to the product and a by-product;
removing at least a portion of the by-product from the liquid using the separator; and
recirculating the liquid through the reaction chamber.

The recirculating reactor may be according to the first aspect of the invention. The method may be conducted in a batchwise or a continuous manner. The method may comprise the step of removing the product (optionally the liquid comprising the product) from the recirculating reactor. Thus product may be continuously removed from the reactor, or the liquid may be recycled through the reactor for a fixed period and then removed therefrom. The step of adding the substrate to the liquid may comprise dissolving, suspending, emulsifying or otherwise dispersing the substrate in the liquid. The substrate may be added batchwise or continuously. The method may also comprise adding one or more substances, for example a reagent, that is (are) necessary for converting the substrate to the product. The substrate may be passed through the reaction chamber under greater than atmospheric pressure, for example between about 0.5 and about 10 MPa. The rate of flow in the system may be sufficiently high that not all of the substrate is converted to the product in a single pass under the conditions of temperature and pressure pertaining in the reaction chamber. The flow rate may be sufficiently high that the conversion of the substrate to the product is greater than the maximum single pass conversion, where the maximum single pass conversion is defined as the maximum achievable conversion using a single pass through the same reaction chamber using the same conditions of temperature and pressure. In this context, the conversion of the substrate is taken to be the conversion at the time that the product is removed from the recirculating reactor. In a batch operation, the conversion will be the amount of product removed from the reactor divided by the amount of substrate added to the reactor. In a continuous operation, the conversion will be the rate of removal of product from the reactor divided by the rate of addition of substrate to the reactor. Commonly the conversion will be expressed as a percentage or as a fraction. The conversion may be expressed as a molar conversion (i.e. for example moles product removed divided by moles substrate added) or as a weight conversion. The flow rate may be sufficiently high that the conversion of the substrate to the product is at least 5% greater than the single pass conversion (expressed as a percentage of the single pass conversion). The flow rate may be sufficiently high that the by-product does not significantly decrease the activity of the catalyst. In this context, "significantly" decrease may refer to decreasing by not more than about 5%, or not more than about 10%.

The recirculating may be for sufficient time for at least two chamber volumes to pass through the reaction chamber. In this context a chamber volume is defined as the free volume of the reaction chamber containing the catalyst (i.e. the volume of liquid that can be fitted into the reaction chamber when the chamber contains the catalyst).

The method may also comprise the step of removing at least a portion of the product, optionally of the liquid comprising the product, from the reactor. This may comprise adjusting a valve in the recirculation system so as to remove at least a portion of the liquid from the recirculation system, said removed liquid comprising the product. The removing may be batchwise, or may be continuous. Thus the valve may be opened completely, so as to remove substantially all of the liquid from the reactor, or it may be partially opened, so that a proportion of the liquid entering the valve is removed from the reactor and a proportion is recycled. In this context, "substantially all" refers to as much as may conveniently removed. It will be understood that following removal of "substantially all" of the liquid, inner surfaces of the reactor may remain wet with residues of the liquid, and the design may be such that "dead legs", the catalyst etc. may also retain some of the liquid, whereby not absolutely all of the liquid would be removed from the reactor. Depending on the design of the system, "substantially all" of the liquid may refer to greater than about 80%, or greater than 85, 90, 95, 96, 97, 98 or 99% of the liquid. The proportion may be adjusted so as to achieve an acceptable conversion to product. The proportion may be adjusted so that the rate of removal of liquid from the reactor matches the rate of addition of matter (substrate, reagent, liquid etc.) to the reactor through the addition port(s). The method may also comprise separating the product from the liquid so removed. The process may comprise purifying the product.

In an embodiment there is provided a method for converting a substrate to a product, comprising:
providing a recirculating reactor comprising a reaction chamber containing a solid catalyst, said reaction chamber comprising a chamber body, a chamber inlet and a chamber outlet; and a recirculation system for recirculating liquid from the chamber outlet to the chamber inlet, said recirculation system comprising a separator for separating a by-product from the liquid;
adding the substrate to the liquid;
passing the substrate in the liquid through the reaction chamber, thereby contacting the substrate with the solid catalyst so as to convert at least a portion of the substrate to the product and a by-product;
removing at least a portion of the by-product from the liquid using the separator;
recirculating the liquid through the reaction chamber; and
removing at least a portion of the product, optionally of the liquid comprising the product, from the reactor.

In another embodiment there is provided there is provided a method for converting a substrate to a product, comprising:
providing a recirculating reactor comprising a reaction chamber containing a solid catalyst, said reaction chamber comprising a chamber body, a chamber inlet and a chamber outlet; and a recirculation system for recirculating liquid from the chamber outlet to the chamber inlet, said recirculation system comprising a separator for separating a by-product from the liquid;
adding the substrate to the liquid;
passing the substrate in the liquid through the reaction chamber, thereby contacting the substrate with the solid catalyst so as to convert at least a portion of the substrate to the product and a by-product;
removing at least a portion of the by-product from the liquid using the separator;
recirculating the liquid through the reaction chamber;
removing at least a portion of the product, optionally of the liquid comprising the product, from the reactor;
separating the product from the liquid so removed; and
purifying the product.

In another embodiment there is provided there is provided a method for converting a substrate to a product, comprising:

providing a recirculating reactor comprising a reaction chamber containing a supported silica catalyst, said reaction chamber comprising a chamber body, a chamber inlet and a chamber outlet; and a recirculation system for recirculating liquid from the chamber outlet to the chamber inlet, said recirculation system comprising a degasser for separating a gas from the liquid;

adding the substrate to the liquid;

passing the substrate in the liquid through the reaction chamber, thereby contacting the substrate with the solid catalyst so as to convert at least a portion of the substrate to the product and the gas;

removing at least a portion of the gas from the liquid using the degasser;

recirculating the liquid through the reaction chamber;

removing at least a portion of the product, optionally of the liquid comprising the product, from the reactor;

separating the product from the liquid so removed; and purifying the product.

The invention also provides a product when made using the method of the invention.

BRIEF DESCRIPTION OF THE DRAWINGS

Preferred embodiments of the present invention will now be described, by way of an example only, with reference to the accompanying drawings wherein.

DETAILED DESCRIPTION OF THE PREFERRED EMBODIMENTS

The present invention provides a recirculating reactor for converting a substrate to a product. The reactor comprises a reaction chamber, a recirculation system and a separator.

The reaction chamber contains a catalyst, and comprises a chamber body, a chamber inlet and a chamber outlet. The catalyst may be in a form which is capable of being retained in the reaction chamber. It may be in the form of a solid, a porous solid, a particulate solid, a microparticulate solid or a gel or a mixture of two or more of these. It may be an encapsulated catalyst (e.g. an encapsulated solid catalyst or an encapsulated liquid catalyst), a catalytic layer or coating on a support (e.g. on a particulate solid or on a high surface area substrate), a catalytic species in and/or on a matrix or it may be in some other suitable form. The catalyst, support and matrix may, independently, be crystalline, partially crystalline or amorphous. The catalyst may comprise a supported catalyst. It may comprise a particulate catalyst, for example a microparticulate or nanoparticulate catalyst. The catalyst may comprise a catalytic group supported on and/or in, or attached to, or bonded to, a catalyst support. The catalyst support may be an inorganic support or an organic support. It may be a ceramic support. It may be a porous support, for example a mesoporous and/or microporous and/or nanoporous support. It may comprise siliceous mesocellular foam. It may have a mean pore size of between about 2 and about 50 nm or between about 10 and 40, 10 and 30, 10 and 20, and 50, 30 and 50, 40 and 50, 20 and 40 or 20 and 30 nm, and may have a mean pore size about 10, 15, 20, 25, 30, 35, 40, 45 or 50 nm. The catalyst support may comprise silica, or a metal, or a metal oxide or mixed metal oxide. The metal may be for example iron, titanium, zirconium or aluminium. The support may be a foam, for example open celled foam, or may be sintered or otherwise porous. It may for example be siliceous mesocellular foam (MCF) or FDU-12, as described in Schmidt-Winkel et al, *Science,* 1999, 548, Lettow et al, *Langmuir,* 2000, 16, 8291 and Fan et al, *Angew. Chem. Int. Ed.,* 2003, 42, 3146. It may be a silica foam according to PCT/SG2005/000194 ("Mesocellular foam particles"), the contents of which are incorporated herein by reference. The catalyst support may be particulate, for example microparticulate or nanoparticulate, and may have a particle size between about 100 nm and about 200 microns. The particle size may be between about 500 nm and 200 microns, or between about 1 and 200, 10 and 200, 50 and 200, 100 and 200, 1 and 100, 1 and 50 or 1 and 10 microns or between about 100 nm and 100 microns, 100 nm and 10 microns, 100 nm and 1 micron or 500 nm and 1 micron, and may be about 100, 200, 300, 400, 500, 600, 700, 800 or 900 microns, or about 1, 2, 3, 4, 5, 6, 7, 8, 9, 10, 20, 30, 40, 50, 60, 70, 80, 90, 100, 110, 120, 130, 140, 150, 160, 170, 180, 190 or 200 microns. The catalyst support may have a narrow particle size distribution. There may be less than about 50% of particles having a particle size more than 10% different from (greater than or less than) the mean particle size, or there may be less than about 45, 40, 35, 30, 25, 20, 15, 10 or 5% of particles having a particle size more than 10% different from the mean particle size, and may be about 1, 2, 3, 4, 5, 10, 15, 20, 25, 30, 35, 40, 45 or 50% of particles having a particle size more than 10% different from the mean particle size. The particles of the catalyst support may for example comprise cell-like mesopores connected by windows of a smaller size. The ratio of the size of the mesopores and the size of the windows may be between about 10:1 and about 1.5:1, or between about 10:1 and 2:1, 10:1 and 5:1, 5:1 and 1.5:1, 3:1 and 1.5:1, 5:1 and 3:1 or 8:1 and 4:1, and may be about 10:1, 9:1, 8:1, 7:1, 6:1, 5:1, 4.5:1, 4:1, 3.5:1, 3:1, 2.5:1, 2:1 or 1.5:1, or may be some other ratio. The particles of the catalyst support may have some other structure. It should be understood that when reference is made to the "pore size" of such materials, it refers to the effective pore size, i.e. the size of the narrowest portion of a flow channel through the material. Thus in a structure comprising cell-like mesopores connected by windows of a smaller size, the "pore size" refers to the size of the windows, and not to the size of the mesopores. The particles may have a pore volume between about 0.5 and about 5 $cm^3/g$, and may have a pore volume between about 0.5 and 2, 0.5 and 1, 1 and 5, 3 and 5 or 1 and 3 $cm^3/g$, and may have a pore volume between about 0.5, 1, 1.5, 2, 2.5, 3, 3.5, 4, 4.5 or 5 $cm^3/g$. They may have a void volume of between about 50 and about 90%, or between about 50 and 70, 60 and 70, 70 and 80, 80 and 90 or 75 and 85%, and may have a void volume of about 50, 55, 60, 65, 70, 75, 80, 85 or 90%. They may have a bulk density of between about 0.2 and about 1 g/ml, or between about 0.5 and 1, 0.2 and 0.5, 0.2 and 0.4, 0.2 and 0.3, 0.3 and 0.4 or 0.25 and 0.35 g/ml. and may have a bulk density of about 0.2, 0.25, 0.3, 0.35, 0.4, 0.45, 0.5, 0.55, 0.6, 0.65, 0.7, 0.75, 0.8, 0.85, 0.9, 0.95 or 1 g/ml. The catalyst support may be a hydrophobic support, e.g. a hydrophobed support. It may comprise hydrophobic groups, e.g. trimethylsilyl groups, on the surface. The catalyst may be insoluble in the liquid used in the recirculating reactor. The catalyst may be capable of catalysing reaction of a substrate to produce a product and a by-product. The catalyst may be any catalyst capable of catalysing conversion of the substrate to the product, optionally in the presence of a reagent or more than one reagent. Similarly, the reaction conducted in the reactor may be any suitable reaction that is capable of being catalysed by the catalyst. It may be a reaction that produces a by-product capable of at least partially deactivating the catalyst with respect to the reaction.

The liquid used in the reactor may comprise a solvent, or a carrier liquid. It may comprise a reagent and/or a substrate for the reaction. It may be aqueous or non-aqueous. It may be polar, non-polar or of intermediate polarity. It may comprise an organic solvent, e.g. a hydrocarbon (aromatic or aliphatic or alicyclic), an ester, an ether, a ketone or some other organic solvent, or a mixture of solvents. It may comprise a solvent for the substrate and/or for the product. It may comprise more than one substance. It may comprise a solution, suspension, emulsion or dispersion of the substrate in a solvent or carrier liquid. Once it has passed through the reaction chamber at least once, the liquid may contain the product, either in solution, in suspension, in emulsion or otherwise dispersed therein, and may also contain unreacted substrate, optionally also unreacted reagent etc.

The chamber body may be capable of withstanding the internal pressures used in the reactor. It may be capable of withstanding an internal pressure of at least about 1 atmosphere, or at least about 2, 3, 4, 5, 10, 20, 50 or 100 atmospheres. It may be capable of withstanding an internal pressure of between about 0.5 and about 10 MPa, or between about 0.5 and 5, 0.5 and 2, 0.5 and 1, 1 and 10, 2 and 10, 5 and 10, 1 and 5 or 1 and 3 MPa, e.g. a pressure of about 0.5, 0.6, 0.7, 0.8, 0.9, 1, 1.5, 2, 2.5, 3, 3.5, 4, 4.5, 5, 6, 7, 8, 9 or 10 MPa. It may be made from a material that is capable of withstanding such pressures, and which is inert to the substances (liquid, substrate, reagent etc.) used in the reactor. It may for example be made of stainless steel, or some other metal, or may be made from a suitable engineering plastic, depending on the nature of the substances used in the reactor. The inlet and outlet to the reaction chamber may be sized so as to permit the desired flow rate to pass through the reaction chamber.

The reactor (e.g. the reaction chamber) may comprise, or be fitted with, a retaining device for retaining the catalyst in the reaction chamber. This device may be located at, located near, or fitted to, the outlet of the reaction chamber and/or, depending on the nature of the device and of the catalyst, the inlet of the reaction chamber. The nature of the retaining device may depend on the physical nature of the catalyst. It may comprise a filter, or frit or porous material or sintered material or some other means to prevent the catalyst from exiting the reaction chamber. The retaining device may comprise a sump. The catalyst may be in a form that prevents it from exiting the reaction chamber during the step of recirculating the liquid. The catalyst may for example comprise a porous catalytic mass that is sufficiently large that it is incapable of passing through the chamber outlet, or it may be associated with (e.g. attached to, bonded to, coated on or retained by) a support (optionally more than one support), or incorporated in a porous matrix, that is sufficiently large that it is either incapable of passing through the chamber outlet or is too heavy to be moved by the recirculating liquid. The retaining device may be the chamber outlet. The reactor may be a flow through reactor, such as a non-fluidised bed. The reaction chamber may be a flow through reaction chamber, such as a non-fluidised bed. The reactor may comprise a fluidised bed. The reaction chamber may comprise a fluidised bed.

The reaction chamber may be oriented either horizontally or vertically or at some other angle, e.g. about 15, 30, 45, 60 or 75° to horizontal, or between about 0 and about 60° to horizontal, or between about 30 and 90, 30 and 60, 45 and 60 or 30 and 45° to horizontal. If the reaction chamber is not horizontal, the liquid may flow through the chamber from the lower end to the higher end or from the higher end to the lower end.

The reaction chamber may be fitted with a temperature controller, e.g. a heater or a cooler, in order to control the temperature within the reaction chamber to a desired temperature. The desired temperature may be an appropriate reaction for conversion of the substrate to the product, e.g. between about 0 and 100° C., or between about 0 and 80, 0 and 60, 0 and 40, 0 and 20, 0 and 10, 10 and 100, 30 and 100, 50 and 100, 10 and 50, 10 and 30, 30 and 80 or 30 and 50° C., e.g. about 0, 5, 10, 15, 20, 25, 30, 35, 40, 45, 50, 55, 60, 65, 70, 75, 80, 85, 90, 95 or 100° C., or some other suitable temperature, depending on the nature of the reaction, and of the deactivation of the catalyst by the by-product. The desired temperature may be such that the conversion rate of substrate to product is acceptably high and the deactivation of the substrate by the by-product is acceptably low (preferably negligible). The reaction chamber may be a suitable shape so as to withstand the pressures outlined above. It may for example be cylindrical. It may be elongate. It may have a length to diameter ratio of between about 1:1 and about 100:1, or about 1:1 and 50:1, 1:1 and about 20:1, 1:1 and about 10:1, 1:1 and about 2:1, 10:1 and 100:1, 20:1 and 100:1, 10:1 and 50:1 or 10:1 and 20:1, e.g. about 1:1, 1.5:1, 2:1, 3:1, 4:1, 5:1, 6:1, 7:1, 8:1, 9:1, 10:1, 11:1, 12:1, 13:1, 14:1, 15:1, 20:1, 25:1, 30:1, 35:1, 50:1, 45:1, 50:1, 60:1, 70:1, 80:1, 90:1 or 100:1. The volume of the reaction chamber will depend on the desired flow rate therethrough, which will depend in part on the desired conversion rate of substrate to product. The volume may be for example between about 100 mm$^3$ and about 10 m$^3$, or between about 100 mm$^3$ and 1 m$^3$, 100 mm$^3$ and 10 L, 100 mm$^3$ and 1 L, 100 mm$^3$ and 100 cm$^3$, 100 mm$^3$ and 1 cm$^3$, 1 cm$^3$ and 10 m$^3$, 1 L and 10 m$^3$, 1 and 10 m$^3$, 1 L and 1 m$^3$, 1 and 100 L or 10 L and 1 m$^3$, e.g. about 100, 200, 300, 400, 500, 600, 700, 800 or 900 mm3, 1, 5, 10, 20, 30, 40, 50, 60, 70, 80 or 90 cm$^3$, 1, 2, 3, 4, 5, 6, 7, 8, 9, 10, 20, 30, 40, 50, 60, 70, 80, 90, 100, 200, 300, 400, 500, 600, 700, 800 or 900 L or 1, 2, 3, 4, 5, 6, 7, 8, 9 or 10 m$^3$, or may be some other volume as required. The desired flow rate may conveniently be between about 2 and 20 chamber volumes per minute, or between about 2 and 10, 2 and 5, 5 and 20, 10 and 20 or 3 and 6 chamber volumes per minute, e.g. about 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19 or 20 chamber volumes per minute.

The recirculation system is adapted for recirculating liquid from the chamber outlet to the chamber inlet. The recirculation system may comprise appropriate piping, tubing etc. for conveying liquid from the chamber outlet to the chamber inlet. The tubing, piping etc. may be sized so as to be capable of passing the required flow rate of liquid. The recirculation system may comprise a pump for recirculating the liquid through the reactor, and may be constructed of materials that are inert to the substances (liquid, substrate, reagent etc.) used in the reactor. The pump may be disposed so as to pump the liquid through the piping, tubing etc. The pump may be capable of pressurising the liquid prior to the liquid entering the reaction chamber. It may be capable of pressurising the liquid to at least about 2, 3, 4, 5, 10, 20, 50 or 100 atmospheres, or between about 0.5 and about 10 MPa, or between about 0.5 and 5, 0.5 and 2, 0.5 and 1, 1 and 10, 2 and 10, 5 and 10, 1 and 5 or 1 and 3 MPa, e.g. a pressure of about 0.5, 0.6, 0.7, 0.8, 0.9, 1, 1.5, 2, 2.5, 3, 3.5, 4, 4.5, 5, 6, 7, 8, 9 or 10 MPa. The pump may be capable of causing the liquid to pass through the reaction chamber at a sufficient rate as to inhibit deactivation of the catalyst by the by-product, or at a sufficient rate that the conversion of the substrate to the product is greater than the maximum single pass conversion. The flow rate may be sufficiently high that the conversion of the substrate to the product is at least 5% greater than the single pass conversion (expressed as a percentage of the single pass conversion), or at least 6, 7, 8, 9, 10, 15, 20, 25, 30, 35, 40, 45 or 50% greater. It will be understood that this rate will depend on the nature of the deactivation reaction, the nature of the by-product, the nature of the catalyst, the dimensions of the reaction chamber and possibly other factors.

The recirculation system may comprise an open container, which may function as a separator by allowing a gaseous or volatile by-product to at least partially escape from the liquid in the reactor. The open container may also function as an addition port, enabling substances such as the liquid, substrate, reagent etc. to be added to the reactor. The recirculation system may additionally or alternatively comprise a separate separator for removing a by-product from the reactor. If the reaction of the substrate produces more than one by-product, there may be a separate separator for removing each by-product, or one separator may remove more than one by-product. At least one of the by-products should be removable from the reactor by a separator.

The separator is adapted for separating the by-product from the liquid. The nature of the separator will depend on the nature of the by-product. The separator may comprise a degasser, for removing a gaseous by-product. The degasser may be a vacuum degasser, a membrane degasser, or some other type of degasser. The separator may comprise a precipitator or a filter or a membrane separator or a centrifuge for separating a solid by-product. It may comprise a sparge (optionally with a gas of low or very low solubility in the liquid, or with a gas that does not deactivate the catalyst). It may comprise a selective absorber, e.g. an absorption column, an affinity membrane or an ion exchanger for removing a dissolved by-product. It may comprise an evaporator or a distillation column (optionally a fractional distillation column) for removing a volatile by-product. It may comprise some other type of device suitable for removing the by-product. The separator may comprise one or more devices suitable for removing a by-product from the liquid. The separator may capable of separating only a portion of the by-product from the liquid. It may be capable of separating a sufficient proportion of the by-product from the liquid that the catalyst is not significantly deactivated. Depending on the nature of the deactivation, the sufficient proportion may be at least about 80%, or at least about 90, 95, or 99%, e.g. about 80, 85, 90, 95, 96, 97, 98, 99, 99.5 or 99.9%. In some embodiments the by-product is in a different physical form to the product and/or to the substrate and/or the reagent (if present). In such embodiments, the by-product may be removed by physical means e.g. degassing (if the by-product is a gas and the product and/or substrate is not a gas), precipitation, filtration, centrifugation etc. (if the by-product is a solid that is insoluble in the liquid and the product and/or substrate is not a solid that is insoluble in the liquid) or by some other physical means. If the product and/or substrate is of similar physical form to the by-product, it may be necessary to use chemical or physicochemical means to remove the by-product. These may for example comprise selective adsorption (e.g. affinity chromatography) or derivatisation (e.g. using a removal reagent) in order, for example, to precipitate a derivative of the by-product, which may then be removed by physical means as described above.

The reaction that converts the substrate to the product may produce one product or more than one product. It may produce one by-product or more than one by-product. The by-product, or at least one of the by-products, may capable of inhibiting the reaction of the substrate to the product(s). It may for example be capable of poisoning or deactivating the catalyst, or it may physically inhibit the catalyst from catalysing the reaction. The by-product, or that by-product or those by-products that are capable of inhibiting the reaction, may be separable from the liquid used in the recirculating reactor. It may be separable from the liquid by means of the separator. An example of a suitable reaction is the conversion of styrene (the substrate) to ethyl 2-phenylcyclopropanecarboxylate (the product) by reaction of ethyl diazoacetate (the reagent) in the presence of MCF-supported azabisoxazoline Cu(I) (the catalyst). In this case the by-product is nitrogen, which may be removed using a degasser. In this case, it may be sufficient for the degasser to comprise an open container or reservoir from which the nitrogen can escape. Another example is the conversion of diethyl diallylmalonate (the substrate) to diethyl cyclopent-3-ene-1,1-dicarboxylate (the substrate) in the presence of MCF-supported Grubbs-Hoveyda catalyst. In this case, no added reagent is used, and the by-product is ethylene, which may be removed using a degasser. The reaction may be a stereospecific reaction or may not be stereospecific, depending on the nature of the catalyst, of the substrate and optionally of the reagent (if present).

The reactor may comprise an outlet port, e.g. a valve (e.g. a 3-way valve), a tap, a take-off point or some other means for removing the liquid from the reactor in order to obtain the product. The outlet port may communicate with the recirculation system or with the reaction chamber. Thus in operation the liquid containing the product may be removed from the reaction chamber or from some point within the recirculation system. The outlet port may be located so that the liquid is removed from the reactor before removal of the by-product therefrom or after removal of the by-product therefrom. The addition port may in some circumstances also serve as the outlet port for removing the liquid. In particular, if the addition port comprises an open, or openable, container, the liquid may optionally be removed therefrom.

The reactor may comprise an addition port for adding substances, e.g. the substrate, the liquid, a reagent and/or other substances to the reactor. The recirculation system may comprise more than one such addition port. It may comprise separate addition ports for adding different substances to the reactor. The addition port, or the addition ports independently in the event that the reactor has more than one addition port, may communicate with the recirculation system or the reaction chamber. Thus each substance (liquid, substrate, reagent etc.) may, independently, be added to the reactor via the recirculation system or directly into the reaction chamber. The addition port may comprise an opening or aperture, an injection point, a valve, a septum or some other suitable type of addition means. It may be closable, optionally sealable, or may be permanently open. The addition port may be fitted with a metering device in order to control the rate and/or amount of addition of a substance to the reactor. The metering device may for example comprise a peristaltic pump, a syringe pump, a gravity feed device or some other suitable metering device.

The reactor may also comprise a mixer for mixing the liquid with substances added thereto (e.g. the substrate, the reagent, solvent, carrier liquid etc.). The mixer may comprise a stirrer, baffles, an agitator or some other form of mixer. It may be disposed within the recirculation system, for example in the tubing or piping thereof or in a container thereof.

The reactor described herein may be any desired scale. It may be a microscale reactor, or a laboratory scale reactor, or a pilot scale reactor, or a production scale reactor. It may be capable of producing the product at rates from 1 mg/hour to about 1 tonne per hour or more. For example the production rate, as a mass per hour, may be between about 1 mg and 10 kg, 1 mg and 1 kg, 1 mg and 100 g, 1 mg and 1 g, 1 and 100 mg, 1 g and 1 tonne, 100 g and 1 tonne, 1 kg and 1 tonne, 100 kg and 1 tonne, 1 g and 10 kg, 1 g and 1 kg, 1 and 100 g, 1 and 100 kg or 10 and 100 kg, e.g. about 1, 5, 10, 50, 100 or 500 mg, or 1, 5, 10, 50, 100 or 500 g, 1, 5, 10, 50, 100 or 500 kg or 1 tonne, or may be more than about 1 tonne. In order to achieve these rates, the addition rate of substrate, quantity of catalyst, the sizes of the tubing, reaction chamber, chamber inlet and outlet, the addition port and other physical attributes of the reactor should be set accordingly. Determination of appropriate parameters is readily accomplished using known methods.

The invention also provides a method for converting a substrate to a product. The method comprises providing a recirculating reactor according to the invention and adding the substrate to the liquid in the reactor. The liquid with the substrate is then passed through the reaction chamber, thereby contacting the substrate with the catalyst so as to convert at least a portion of the substrate to the product and a by-product. After the liquid with the substrate has passed through the reaction chamber, at least a portion of the by-product is removed from the liquid using the separator. The liquid is then recirculated through the reaction chamber.

The step of adding the substrate to the liquid may comprise dissolving, suspending, emulsifying or otherwise dispersing the substrate in the liquid. This may require agitation, stirring, sonication or some combination of these. The substrate may be added batchwise or continuously. It may be added rapidly or slowly. The substrate (and, independently, other substances added to the reactor) may be added neat or in solution, suspension, emulsion or dispersion. Different substances may be added together or separately. Thus, for example, if a reagent is added as well as the substrate, these may be premixed prior to addition to the reactor, optionally in a solvent, or they may be added separately to the reactor. The rate of addition of substances (substrate, liquid e.g. solvent, reagent etc.) to the reactor may be equal to the rate at which liquid is removed from the outlet port. This is particularly useful in the case of a continuously operated reactor, in which the quantity of liquid in the reactor is preferably in a steady state.

The method may comprise adding one or more substances, for example a reagent or a cocatalyst, that is (are) necessary for converting the substrate to the product. This will depend on the nature of the reaction. Thus the reagent may be capable of reacting with the substrate in the presence of the catalyst to produce the product and the by-product.

The substrate may be passed through the reaction chamber under greater than atmospheric pressure. It may be passed through the reaction chamber at a pressure of at least about 1 atmosphere, or at least about 2, 3, 4, 5, 10, 20, 50 or 100 atmospheres. It may be capable of withstanding an internal pressure of between about 0.5 and about 10 MPa, or between about 0.5 and 5, 0.5 and 2, 0.5 and 1, 1 and 10, 2 and 10, 5 and 10, 1 and 5 or 1 and 3 MPa, e.g. a pressure of about 0.5, 0.6, 0.7, 0.8, 0.9, 1, 1.5, 2, 2.5, 3, 3.5, 4, 4.5, 5, 6, 7, 8, 9 or 10 MPa.

The rate of flow in the system may be sufficiently high that not all of the substrate is converted to the product in a single pass under the conditions of temperature and pressure pertaining in the reaction chamber. It may be sufficient to convert less than about 80, 70, 60, 50, 40, 30 or 20% of the substrate (e.g. about 1, 2, 3, 4, 5, 6, 7, 8, 9, 10, 15, 20, 25, 30, 35, 40, 45, 50, 60, 70 or 80%) to the product in a single pass. The flow rate may be sufficiently high that the by-product does not significantly decrease the activity of the catalyst. In this context, "significantly" decrease may refer to decreasing by not more than about 5%, or not more than about 6, 7, 8, 9 or 10%. The step of removing at least a portion of the by-product may comprise degassing the liquid to remove a gaseous by-product, filtering or centrifuging the liquid to remove a solid by-product, passing the liquid through a selective absorber, such as an ion exchanger, an affinity chromatography column or some other selective absorber, or may comprise some other removal process, or may comprise a combination of two or more such processes. The step of removing at least a portion of the by-product may remove at least about 80% thereof, or at least about 85, 90, 91, 92, 93, 94, 95, 96, 97, 98, 99, 99.5 or 99.9% thereof (or may remove about 80% thereof, or about 85, 90, 91, 92, 93, 94, 95, 96, 97, 98, 99, 99.5 or 99.9% thereof). The reactor may be designed so as to remove an appropriate proportion of the by-product, said appropriate proportion being dependent on the level of by-product in the liquid in the reactor that does not substantially reduce the activity of the catalyst.

The recirculating may be for sufficient time for at least two chamber volumes to pass through the reaction chamber, or at least 5, 10, 20, 50, 100, 500, 1000 or 2000 chamber volumes, or between about 2 and about 5000 chamber volumes, or about 2 and 2000, 2 and 1000, 2 and 500, 2 and 100, 2 and 50, 2 and 10, 10 and 5000, 50 and 5000, 100 and 5000, 500 and 5000, 1000 and 5000, 500 and 2000, 500 and 1000 or 500 and 800, e.g. 2, 3, 4, 5, 10, 15, 20, 25, 30, 35, 40, 45, 50, 60, 70, 80, 90, 100, 150, 200, 250, 300, 350, 400, 450, 500, 550, 600, 650, 700, 750, 800, 850, 900, 950, 1000, 1500, 2000, 2500, 3000, 3400, 4000, 4500 or 5000 chamber volumes. In this context a chamber volume is defined as the free volume of the reaction chamber containing the catalyst (i.e. the volume of liquid that can be fitted into the reaction chamber when the chamber contains the catalyst; or the actual volume of the chamber less the volume of the catalyst, where the volume of the catalyst does not include the volume of pores in the catalyst, if present).

The method may also comprise the step of removing at least a portion of the liquid comprising the product from the reactor. This may comprise adjusting the exit port, e.g. a valve in the recirculation system, so as to remove at least a portion of the liquid from the recirculation system, said removed liquid comprising the product. The removing may be batchwise, or may be continuous. In batchwise operation, the liquid is recycled through the reactor for a period without removal of liquid, and then a portion, commonly substantially all, of the liquid is removed from the reactor. In continuous operation, a proportion of the liquid is removed continuously and the balance is recycled. Thus the valve may be opened completely, so as to remove substantially all of the liquid from the reactor, or it may be partially opened, so that a proportion of the liquid entering the valve is removed from the reactor and a proportion is recycled. The proportion that is recycled may be adjusted so as to achieve an acceptable conversion to product. The acceptable conversion may depend on the ease of isolation of the substrate and/or the product and other factors. The acceptable conversion may be at least about 50%, or at least about 60, 70, 80, 90, 95 or 99%, and may be for example about 50, 55, 60, 65, 70, 75, 80, 85, 90, 91, 92, 93, 94, 95, 96, 97, 98, 99, 99.5 or 99.9%. The proportion that is recycled may be adjusted so that the rate of removal of liquid from the reactor matches the rate of addition of matter (substrate, reagent, liquid etc.) to the reactor through the addition port(s). The proportion may be such that the proportion of recycle (i.e. the amount or flow rate recycled divided by the amount or flow rate out of the reaction chamber) is between about 0.5 and 1, or between about 0.5 and 0.99, 0.5 and 0.9, 0.5 and 0.8, 0.5 and 0.7, 0.5 and 0.6, 0.8 and 1, 0.9 and 1, 0.95 and 1, 0.99 and 1, 0.8 and 0.95 or 0.9 and 0.99, for example about 0.5, 0.55, 0.6, 0.65, 0.7, 0.75, 0.8, 0.85, 0.9, 0.95, 0.96, 0.97, 0.98, 0.99 or 1. The method may also comprise separating the product from the liquid so removed. Separation methods that may be used are well known in the art, and include for example, crystallisation, evaporation, non-solvent precipitation etc. The process may comprise purifying the product. This again may be accomplished by well known methods. These include recrystallisation, distillation, fractional distillation, chromatography (gc, hplc, preparative tlc, affinity chromatography etc.) solvent extraction etc.

Alternatively, the product may be removed from the liquid using a product separator, wherein the product separator forms a part of the recycling system. The nature of the product separator will depend on the nature of the product and of the substrate, any may be for example a distillation apparatus, optionally a fractional distillation apparatus, a pervaporation apparatus, a filtration apparatus, an affinity separation apparatus (i.e. a selective adsorber or absorber) or some other suitable type of separator. The one separator may separate the by-product and the product from the liquid in the reactor. In this case, following separation of the by-product and the product, the product may be separated from the by-product by standard separation techniques.

Suitable products that may be made by using the reactor of the present invention, or the method of the present invention, include (but are not limited to) chiral products, peptides, drugs, monomers, polymers, pharmaceutical intermediates, fine chemicals, agricultural chemicals, dyes, chemical reagents etc.

In an embodiment the present specification describes a circulating flow-type packed bed reactor with porous silica-supported catalysts. The reactor is particularly useful for catalytic reactions that generate gases and/or side-products that inhibit the reactions. A circulating flow-type packed bed reactor, as described herein, can remove gases and volatile side-products quickly via rapid circulating flow. This makes the catalytic reaction system much more efficient. This reactor may be regarded as a hybrid of a batch reactor and a continuous flow reactor. It retains some of the benefits associated with a continuous flow reactor, such as more on-stream time, and less catalyst attrition/loss.

Conventionally, most asymmetric catalytic reactions involve batch processing. In contrast with a simple batch processor, a circulating flow-type packed bed reactor has numerous advantages including more on-stream time, less maintenance, more consistent product streams, less solvent waste, and less catalyst attrition/loss. The circulating flow-type packed bed reactor can also be applied for catalytic reactions that generate gases and/or rate-inhibiting side-products.

EXAMPLES

Example 1

Aza(bisoxazoline) was prepared by the reported method (H. Werner, R. Vicha, A. Gissibl, O. Reiser, *J. Org. Chem.* 2003, 68, 10166) with moderate yield. It was deprotonated easily with sodium hydride in tetrahydrofuran (THF), and the resulting anion was reacted with electrophilic trialkoxysilane to give T-silylfunctionalized aza(bisoxazoline) [(a) S. S. Lee, J. Y. Ying, "Immobilization of Bisoxazolines onto Siliceous Mesocellular Foams for Asymmetric Cyclopropanation," 1st International SBE Conference on Bioengineering and Nanotechnology, Singapore, September 2004; b) S. S. Lee, J. Y. Ying, "Immobilization of Bisoxazolines on Siliceous Mesocelluar Foams (MCF) for Asymmetric Cyclopropanation," 18th North American Catalysis Society Meeting, Cancun, Mexico, June 2003]. Siliceous mesocellular foam (MCF) precapped with trimethylsilyl (TMS) groups was synthesized by adding hexamethyldisilazane (HMDS) (0.4 mmol) to MCF (1.0 g) suspended in toluene, yielding about 0.8 mmol of TMS/g of MCF. The T-silylfunctionalized aza(bisoxazoline) was immobilized onto MCF and partially TMS-precapped MCF by heating in toluene (see Scheme 1).

Scheme 1. Synthesis of MCF-supported aza(bisoxazoline) 1.

1

MCF-supported aza(bisoxazoline) 1 was reacted with Cu(OTf)$_2$ to give a copper complex, which was reduced to 1:Cu(I). 1:Cu(I) showed high enantioselelectivity (93% ee for trans isomer), high trans/cis ratio (72/28) and excellent recyclability in the asymmetric cyclopropanation of styrene (Scheme 2).

Scheme 2. Asymmetric cyclopropanation of styrene.

Figure 1:
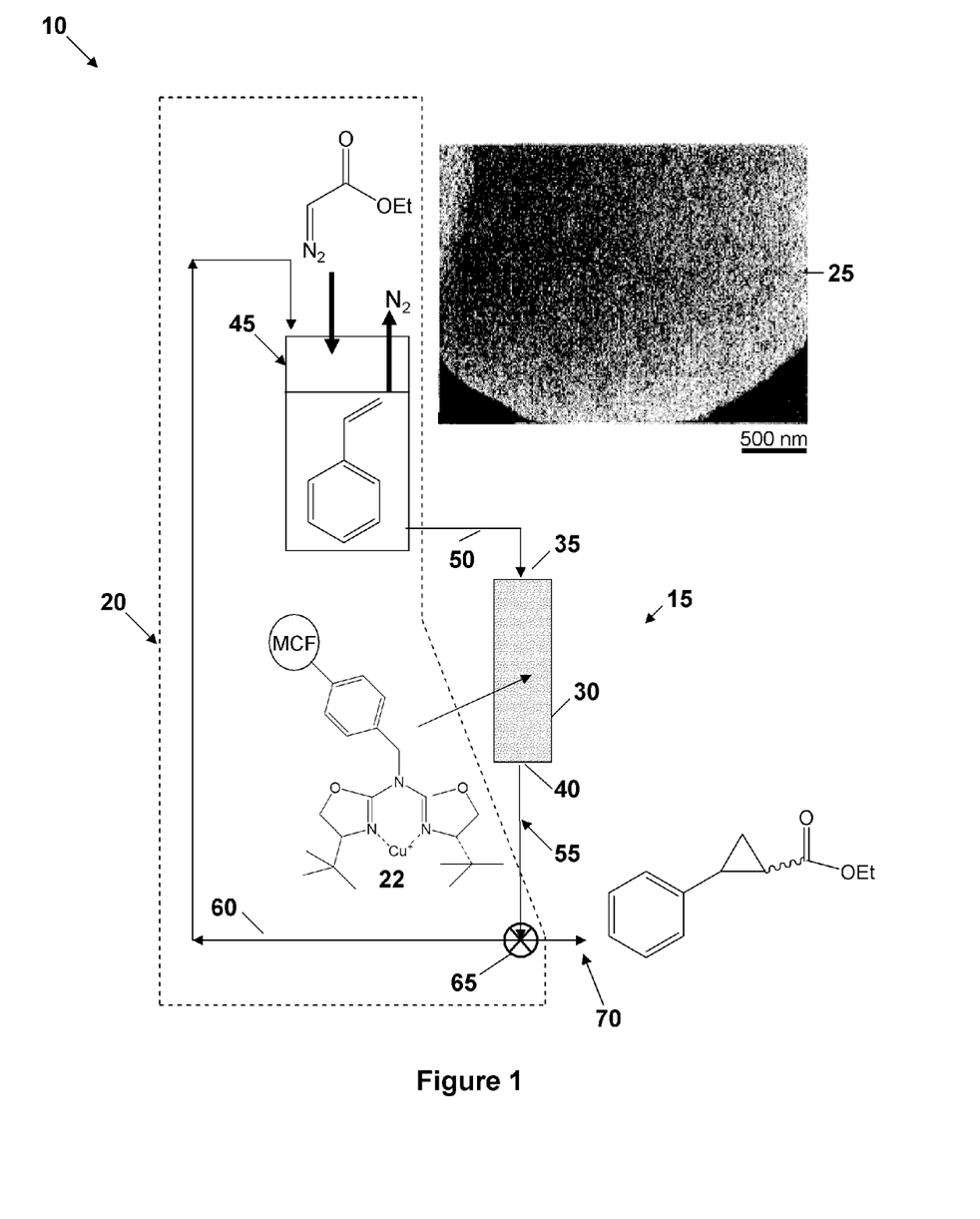
FIG. 1 is a diagram showing the experimental set-up for a circulating flow-type reactor using a HPLC pump system, with an inset showing a high magnification SEM (scanning electron microscope) micrograph of a spherical siliceous mesocellular foam (MCF) particle.

Recirculating reactor: The recirculating reactor used in Example 1 is shown in FIG. 1. With reference to FIG. 1, recirculating reactor 10 comprises reaction chamber 15 and recirculation system 20. Reaction chamber 15 contains MCF-supported catalyst 22, which comprises catalytic metal complexed bisoxazoline groups. In this example, reaction chamber 15 is a packed bed reactor (column) of length 50 mm and internal diameter 4.6 mm. Catalyst 22 is capable of catalysing reaction of styrene (substrate) with ethyl diazoacetate (reagent) to form ethyl 2-phenylcyclopropanecarboxylate (product) and nitrogen gas (by-product), as shown in Scheme 2. Inset 25 shows an electron micrograph of catalyst 22. Reaction chamber 15 comprises chamber body 30, chamber inlet 35 and chamber outlet 40. Recirculation system 20 comprises open container (reservoir) 45, which is capable of functioning as a separator (degasser) by allowing nitrogen to at escape from the liquid in the reactor. Container 45 also functions as an addition port, enabling solvent, substrate and reagent to be added to the reactor as needed. Reactor 10 also comprises inlet tubing 50, for conducting solvent, substrate and reagent to inlet 35 of reaction chamber 15, outlet tubing 55 fitted to outlet 40 of reaction chamber 15 and recirculation tubing 60 for recycling solvent, product, by-product and unreacted substrate and reagent to container 45. Reactor 10 also comprises valve 65 which is capable of directing liquid from reaction chamber 15 either through recirculation tubing 60 or through outlet port 70, which is provided for removing product from the reactor. Valve 65 may also be adjusted so as to direct a desired portion of the liquid from reaction chamber 15 through recirculation tubing 60 and the balance of the liquid through outlet port 70. Reactor 10 also comprises a pump (not shown) for recirculating the liquid through the reactor.

Comparative Example 1

The MCF-supported catalyst was applied to a continuous flow reactor. The catalyst 1:Cu(OTf)$_2$ was packed into a small empty HPLC column (50 mm×4.6 mm), followed by reducing Cu(II) to Cu(I). Ethyl diazoacetate (EDA) solution in CH$_2$Cl$_2$ and styrene solution in CH$_2$Cl$_2$ were continuously mixed and slowly flowed into a packed bed reactor with a flow rate of 0.2 ml/min by using a HPLC pump system to obtain a full conversion. This reaction generated a lot of nitrogen as a by-product, which would stay in the reactor for a long time. This resulted in the rapid catalyst deactivation within 1 hr, leading to low conversion (<50%) and enantioselectivity (<70% ee for trans isomer), even with increased introduction of styrene (styrene/EDA=10).

Inventive Example 1

Figure 2:
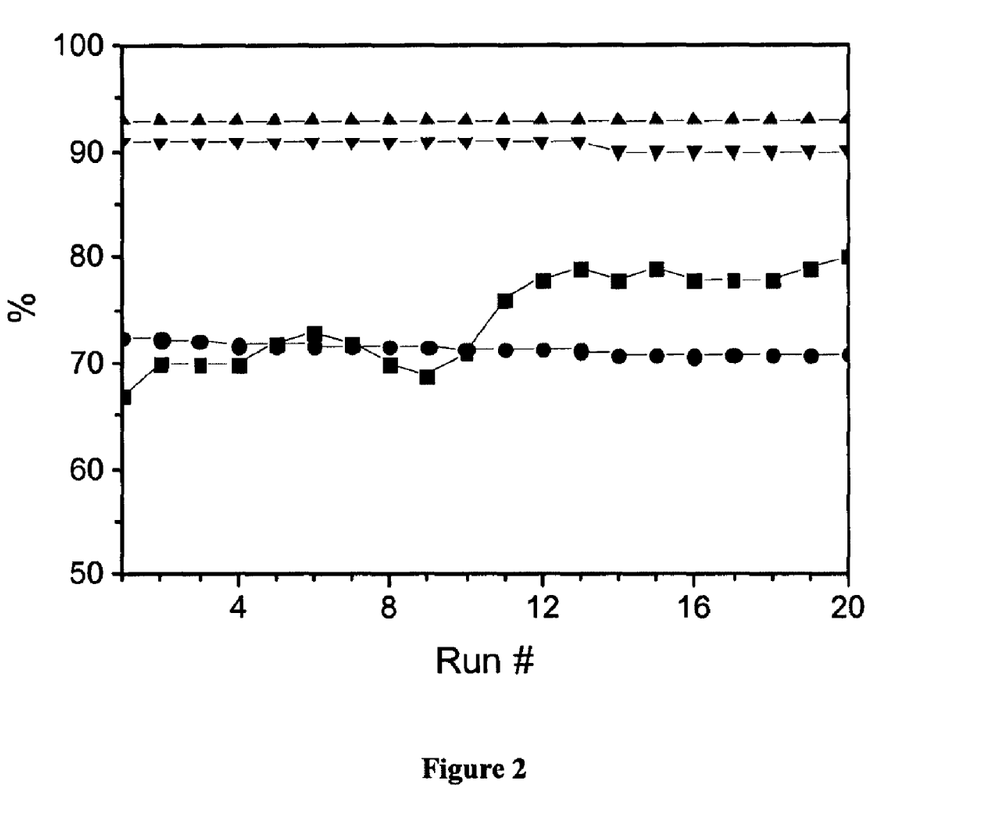
FIG. 2 is a graph showing % ee (enantiomeric excess) for (▲) trans isomer and (▼) cis isomer, (●) trans/cis ratio and (■) yield for the asymmetric cyclopropanation of styrene in a circulating flow-type reactor using 1:Cu(I) in a packed bed of dimensions 50 mm×4.6 mm I.D. with 230 mg catalyst and a total amount of reaction medium of 18 ml for runs #1-10, 14 ml for runs #11-20.

In a modified system, styrene solution in CH$_2$Cl$_2$ was circulated through the packed bed reactor at a high flow rate (5 ml/min), and then EDA was added slowly into the circulating solution. A high flow rate of 5 ml/min was used to remove nitrogen quickly, giving a slightly high back pressure (up to 4.48 MPa). The circulating flow-type reactor showed excellent performance, achieving the same enantioselectivities (93% ee for trans isomer) and high yields (up to 80%) during 20 cycles (FIG. 2). The reaction time per cycle was greatly reduced to 75 min for higher productivity: it was 5.6 times shorter than the typical reaction time in a batch reactor (420 min). When the reaction time of the batch reactor was reduced to 75 min, similar enantioselectivity (93% ee for trans isomer) and yield (82%) were also achieved.

This circulation flow-type reactor may be seen as a hybrid between a batch reactor and a continuous flow reactor that retained some advantages of a continuous flow-type reactor, such as more on-stream time, and less catalyst attrition and loss. The large pore size of MCF made this system possible with relatively low back pressure. Scale-up with reduced back pressure could be attained by increasing the particle size and pore size, or by using the commercial porous silica for preparative HPLC.

Example 2

Heterogenized Grubbs-Hoveyda catalyst was derived using MCF-supported Hoveyda ligand, which was immobilized through carbamate linker group (Scheme 3).

Scheme 3. Synthesis of MCF-supported Grubbs-Hoveyda catalyst.

Figure 3:
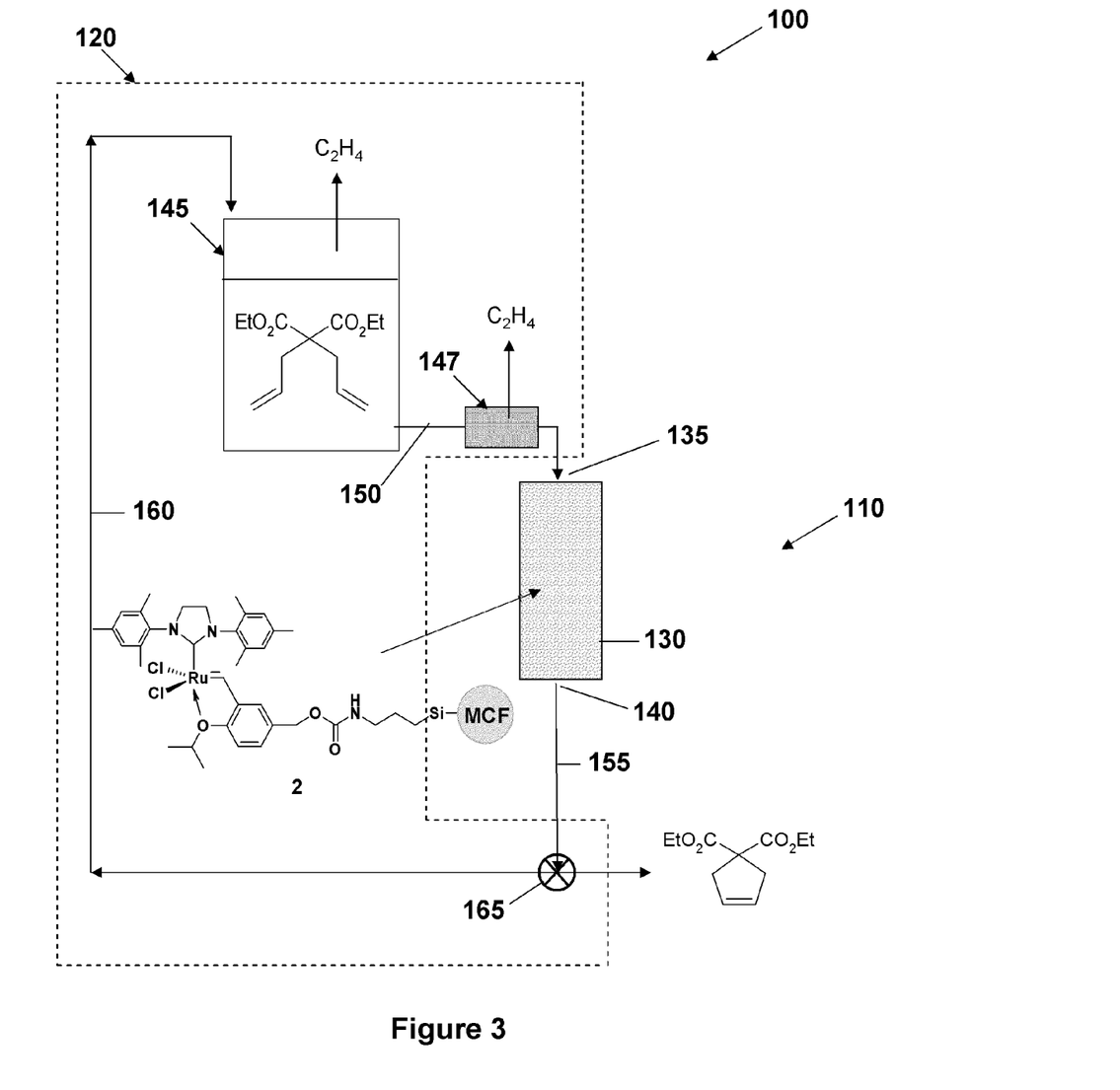
FIG. 3 is a diagram showing the experimental set-up for a circulating flow-type reactor containing MCF-supported Grubbs-Hoveyda catalyst using a HPLC pump system.

Recirculating reactor: The recirculating reactor used in Example 2 is shown in FIG. 3. With reference to FIG. 3, recirculating reactor 100 comprises reaction chamber 110 and recirculation system 120. Reaction chamber 110 contains MCF-supported catalyst 2. In this example, reaction chamber 110 is a packed bed reactor (column) of length 50 mm and internal diameter 4.6 mm. Catalyst 2 is capable of catalysing reaction of diethyl diallylmalonate (substrate) to form diethyl cyclopent-3-ene-1,1-dicarboxylate (product) and ethylene gas (by-product), as shown in Scheme 4. Reaction chamber 110 comprises chamber body 130, chamber inlet 135 and chamber outlet 140. Recirculation system 120 comprises open container (reservoir) 145, which is capable of functioning as a separator (degasser) by allowing nitrogen to at escape from the liquid in the reactor. Container 145 also functions as an addition port, enabling solvent and substrate to be added to the reactor as needed. Recirculation system 120 also comprises degasser 147, for removing ethylene which is not removed as the liquid in the reactor passes through container 145 from said liquid. Reactor 100 also comprises inlet tubing 150, for conducting solvent and substrate to inlet 35 of reaction chamber 15. Degasser 147 is fitted to inlet tubing 150. Additionally reactor 100 comprises outlet tubing 155 fitted to outlet 140 of reaction chamber 110 and recirculation tubing 160 for recycling solvent, product, by-product and unreacted substrate to container 145. Reactor 100 also comprises valve 165 which is capable of directing liquid from reaction chamber 110 either through recirculation tubing 160 or through outlet port 170, which is provided for removing product from the reactor. Valve 165 may also be adjusted so as to direct a desired portion of the liquid from reaction chamber 110 through recirculation tubing 160 and the balance of the liquid through outlet port 170. Reactor 101 also comprises a pump (not shown) for recirculating the liquid through the reactor.

MCF-supported Grubbs-Hoveyda catalyst 2 showed good recyclability in ring-closing metathesis (RCM) of diethyl diallylmalonate (Scheme 4). It is very important to remove ethylene as a side-product quickly from the reactor for a more efficient irreversible reaction, and to minimize catalyst decomposition. Reaction inhibition by ethylene made catalyst application to a continuous flow system very difficult. Long retention of ethylene in the reactor decreased the RCM product conversion and deactivated the catalyst more quickly.

Scheme 4. RCM of diethyl diallylmalonate.

Figure 4:
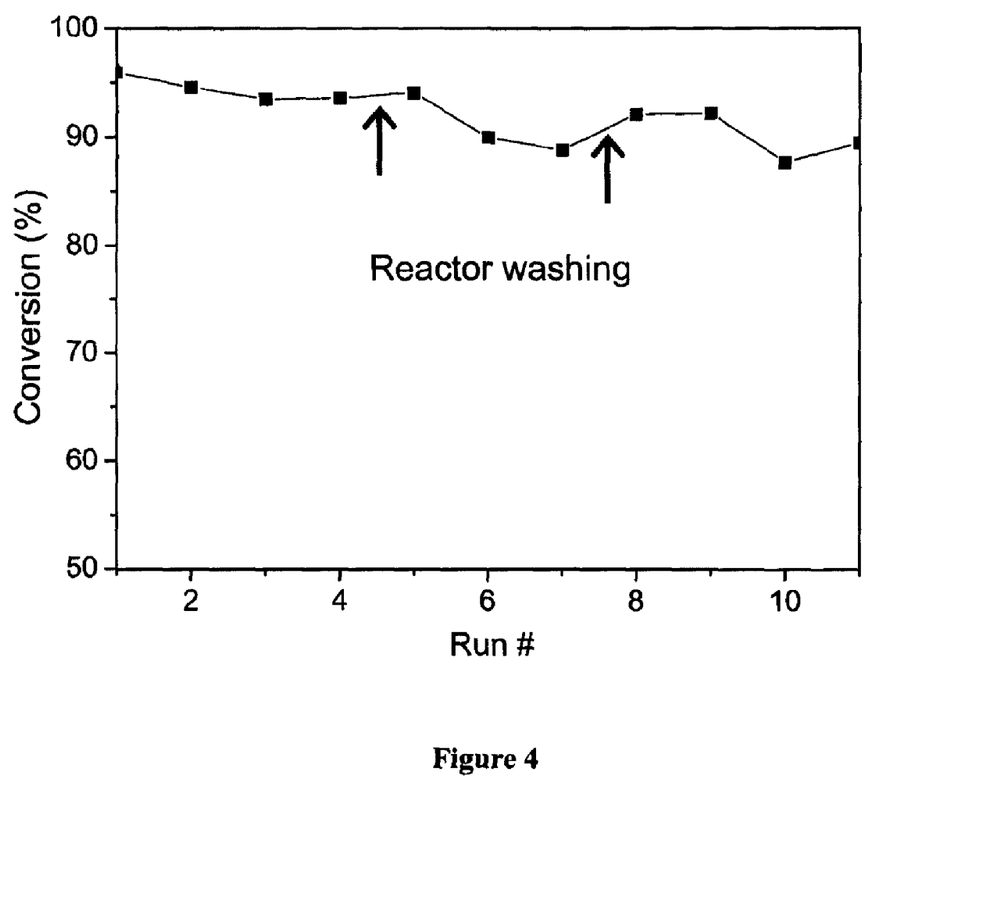
FIG. 4 is a graph showing conversion for RCM (ring-closing metathesis) of diethyl diallylmalonate in a circulating flow-type packed bed reactor using MCF-supported Grubbs-Hoveyda catalyst in a packed bed of dimensions 50 mm×4.6 mm I.D. with 200 mg catalyst and reaction conditions: 2 h at room temperature for each run with substrate concentration 0.05 M for runs #2-4 and 6; 0.075 M for runs #1, 5 and 7; 0.15 M for runs #8-11.

A circulating flow-type packed bed reactor was able to remove ethylene quickly by using a degasser between the reservoir and packed bed reactor (FIG. 3). After achieving high conversion, the product was easily collected at the end of the reactor. When the substrate concentration was increased, the recyclability could be improved without forming other side-products (as confirmed by nuclear magnetic resonance (NMR) spectroscopy). The reactor system achieved high conversion during 11 cycles (FIG. 4). Without recirculation, 9% conversion to product was achieved in 90 min at a flow rate of 0.02 ml/min. With recirculation, as described in the present invention, 96% conversion was achieved in 90 min at a flow rate of 5 ml/min.

Conclusions

Circulating flow-type packed bed reactor was successfully applied to gas-generating reactions (e.g. asymmetric cyclopropantion) and reactions inhibited by side-products (e.g. RCM). The gaseous by-product and volatile side-product were removed rapidly by circulating the reaction medium through a packed bed reactor at a high flow rate.

Experimental

General Synthesis

Spherical MCF was synthesized by modification of the literature procedure (Schmidt-Winkel, P.; Lukens, W. W., Jr.; Zhao, D.; Yang, P.; Chmelka, B. F.; Stucky, G. D. *J. Am. Chem. Soc.* 1999, 121, 254). It was dried under vacuum at 120° C. overnight before use. Other chemicals were purchased from commercial suppliers, and were used without further purification. L-tert-leucine, anhydrous THF, toluene, anhydrous $CH_2Cl_2$, styrene, phenylhydrazine and EDA were purchased from Aldrich. Azabisoxazolines were prepared according to literature. (p-Chloromethyl)phenyltrimethoxysilane and isocyanatopropyltriethoxy-silane were purchased from Gelest Inc. Photoacoustic Fourier-transform infrared (PA-FTIR) spectra were recorded on a Bio-rad FTS-60A spectrometer with a MTEC Model 200 photoacoustic cell. $^1H$ and $^{13}C$ NMR spectra were recorded on a 400 MHz Bruker spectrometer at ambient temperature. $^{13}C$ and $^{29}Si$ cross-polarization magic angle spinning (CPMAS) NMR spectra were recorded on a 400 MHz Bruker spectrometer. Elemental analyses were performed with CE440 CHN Analyzer (Exeter Analytical).

Pre-Capping of MCF

MCF (5.0 g) was well dispersed in toluene (60 ml). HMDS (2.0 mmol) was slowly added into the suspension. The mixture was stirred for 1 h at room temperature and heated at 60° C. overnight. The suspension was filtered, washed with toluene, and dried under vacuum.

Elemental analysis of pre-capped MCF: C, 2.86%; H, 0.94%.

Loading of TMS groups: 0.794 mmol/g.

Preparation of 1

THF (5 ml) was added to NaH (22 mg, 0.92 mmol) and azabisoxazoline (200 mg, 0.75 mmol). The resulting solution was stirred for 6 h at 60° C. to give a clear solution. (p-chloromethyl)phenyltrimethoxysilane (162 μl, 0.75 mmol) was added and stirred at 60° C. overnight. White precipitates (NaCl) were formed and removed using centrifugation. The clear solution portion was added to MCF (2.5 g) or MCF (3.0 g) in toluene (40 ml), and heated to 120° C. overnight. The suspension was filtered through a filter funnel, and washed with toluene (20 ml×3), $CH_2Cl_2$ (20 ml×3), water (20 ml×10), methanol (20 ml×3) and $CH_2Cl_2$ (20 ml×3). The catalyst collected (1.0 g) was dried at 80° C. for 1 day. Excess HMDS (0.75 ml) was added to the solid under vacuum. The flask was cooled down using liquid $N_2$ under vacuum. It was sealed and then warmed to room temperature. After that, the flask was placed in the oven at 75° C. for 5 h. After the reaction, excess HMDS was removed under vacuum, yielding the desired product 1.

$^{13}C$ CPMAS NMR (100 MHz): δ 157.3 (C=N), 140.4, 133.9, 127.2, 73.6, 68.5, 49.8, 32.9, 23.7, −0.2.

$^{29}Si$ CPMAS NMR (79.5 MHz): δ 13.8 ($Si(CH_3)_3$), −62.1 ($T^1$), −69.6 ($T^2$), −77.4 ($T^3$), −101.5 ($Q^3$), −108.6 ($Q^4$).

PA-FTIR (cm$^{-1}$): 3076, 2958, 2907, 2874, 2850, 1648, 1479, 1395, 1079, 846, 812, 758.

Elemental analysis: C, 11.21%; H, 1.94%; N, 1.03%.

Loading of aza(bisoxazoline): 0.245 mmol/g.

Circulating Flow-Type Reactor with Catalyst 1:Cu(I)

1:Cu(OTf)$_2$ (230 mg, 0.03 mmol) was packed into an empty HPLC column (50 mm×4.6 mm I.D.). A pump system of HPLC was used to flow a solution into the column. Phenylhydrazine (3.5 µl, 0.036 mmol) solution in CH$_2$Cl$_2$ (5 ml) was flowed through the column to reduce Cu (II) to Cu (I), and the column was washed by flowing CH$_2$Cl$_2$. Styrene (688 µl, 6.0 mmol) solution in CH$_2$Cl$_2$ (9 ml) was flowed from a reservoir flask to the column at 5 ml/min. EDA (315 µl, 3.0 mmol) and dodecane (342 µl, 1.5 mmol) in CH$_2$Cl$_2$ (9 ml) were then added into the reservoir flask over 55 min. The solution of the reservoir was further circulated for 20 min to give a clear solution, and the solution was collected at the end of the column. The yield and trans/cis ratio were determined by gas chromatography (GC). The enantiomeric excess (ee) was determined by GC using a Chiraldex-B column. The column was washed by flowing CH$_2$Cl$_2$ (15 ml), and then another cycle of the reaction was performed by the same procedure without further reduction of the catalyst with phenylhydrazine.

Preparation of Catalyst 2

A Schlenk flask was charged with the 3-vinyl-4-isopropoxybenzyl alcohol (Kingsbury, J. S.; Garber, S. B.; Giftos, J. M.; Gray, B. L.; Okamoto, M. M.; Farrer, R. A.; Fourkas, J. T.; Hoveyda, A. H. *Angew. Chem. Int. Ed.* 2001, 40, 4251) (1.92 g, 10.0 mmol), 3-isocyanylpropyl-1-triethoxysilane (2.49 ml, 10.0 mmol), 4-dimethylpyridine (12.2 mg, 0.10 mmol), triethylamine (2.79 ml, 20.0 mmol), and dried dichloromethane (DCM) (10 ml) under argon. The reaction mixture was heated for 48 h under reflux. DCM and triethylamine were removed under reduced pressure. Hexane (10 ml) was added, and the precipitate was removed by filtration. The filtrate was concentrated under reduced pressure, and dried under vacuum to give the corresponding carbamate (3.63 g, 8.26 mmol) as a colorless oil, which was used without further purification.

$^1$H-NMR (400 MHz, CDCl$_3$): δ 0.64 (t, 2H, J=8.0 Hz), 1.24 (t, 9H, J=7.2 Hz), 1.35 (d, 6H, J=6.0 Hz), 1.62 (m, 2H), 3.19 (m, 2H), 3.82 (q, 6H, J=7.2 Hz), 4.54 (septet, 1H, J=6.0 Hz), 5.03 (bs, 2H), 5.25 (dd, 1H, J=11.2, 1.4 Hz), 5.75 (dd, 1H, J=17.6, 1.4 Hz), 6.86 (d, 1H, J=8.4 Hz), 7.04 (dd, 1H, J=17.6, 11.2 Hz), 7.22 (dd, 1H, J=8.4, 2.2 Hz), 7.48 (d, 1H, J=2.2 Hz).

$^{13}$C-NMR (100 MHz, CDCl$_3$): δ 7.6, 18.3, 22.1, 23.3, 43.4, 58.4, 66.4, 70.9, 106.6, 114.0, 114.3, 126.9, 128.6, 129.0, 131.7, 155.1, 156.5.

MS (FAB): m/z (%) 438 (38) [M+−H], 392 (20) [M$^+$−EtOH—H], 364 (16), 297 (5), 264 (18), 220 (89), 174 (100).

HRMS (FAB) calculated for C$_{22}$H$_{36}$NO$_6$Si: 438.2331, found 438.2328.

A Schlenk flask was charged with MCF (1.95 g, 0.80 mmol TMS/g), and placed under vacuum for 24 h at 120° C. The flask was purged with argon at room temperature, and charged with dried toluene (20 ml) and the corresponding triethoxysilane (196 mg, 0.45 mmol). The resulting mixture was heated for 48 h at 100° C. Upon cooling to room temperature, the solid was thoroughly rinsed by toluene, DCM, methanol, and DCM (50 ml each). The white solid was transferred to a Schlenk flask, and dried under vacuum for 12 h at 80° C. After cooling down to room temperature, HMDS (1 ml) was added with the flask sealed. The flask was placed in liquid nitrogen bath for 10 min under vacuum. It was sealed and kept at 80° C. for 5 h. The resulting solid was cooled to room temperature, washed thoroughly with DCM (100 ml), and then dried under vacuum for 24 h to give the corresponding immobilized ligand (2.15 g) as a white powder.

Elemental analysis, found: C, 8.16%; H, 1.66%; N, 0.31%.
Loading of ligand: 0.22 mmol/g.

A two-necked flask equipped with a reflux condenser was charged with immobilized ligand (1.00 g, 0.22 mmol/g), second-generation Grubbs' catalyst (187 mg, 0.22 mmol), copper chloride (22 mg, 0.22 mmol) and dried DCM (10 ml) under argon. The reaction mixture was heated for 18 h under reflux in a stream of argon. The reaction mixture gradually changed from dark brown to deep green. After cooling to room temperature, the fine powder was washed thoroughly with DCM (100 ml) under open atmosphere, and dried under vacuum for 24 h to give the immobilized catalyst 2 (594 mg) as a green powder.

Loading of catalyst: 0.18 mmol/g.

Circulating Flow-Type Reactor with Catalyst 2

2 (200 mg, 0.036 mmol) was packed into an empty HPLC column (50 mm×4.6 mm I.D.). A pump system of HPLC was used to flow a solution into the column. Diethyl diallylmalonate solution in CH$_2$Cl$_2$ (0.05-0.15 M) was flowed from a reservoir flask to the column at a flow rate of 5 ml/min. The solution of the reservoir was circulated for 2 h, and the solution was collected at the end of the column. The conversion was determined by GC. The next reaction cycle was performed by the same procedure.

While the present invention has been described in some detail for purposes of clarity and understanding, one skilled in the art will appreciate that various changes in form and detail can be made without departing from the true scope of the invention. All figures, tables, and appendices, as well as patents, applications, and publications, referred to above, are hereby incorporated by reference.

What is claimed is:

1. A method for converting a substrate to a product, comprising:
    (a) providing a recirculating reactor comprising:
        1) a packed bed reaction chamber containing a particulate catalyst, said reaction chamber comprising a chamber body, a chamber inlet, a chamber outlet and a retaining device for retaining the catalyst in the reaction chamber;
        2) a recirculation system configured to recirculate liquid from the chamber outlet to the chamber inlet; and
        3) a separator configured to separate a by-product from the liquid, wherein said separator is located upstream of the chamber inlet;
    (b) passing the substrate in the liquid through the reaction chamber, thereby contacting the substrate with the catalyst so as to convert at least a portion of the substrate to the product and the by-product, wherein the by-product is a poison for the catalyst;
    (c) removing at least a portion of the by-product from the liquid using the separator;
    (d) recirculating a first portion of the liquid through the reaction chamber after step (c);
    (e) removing a second portion of the liquid comprising the product from the reactor; and
    (f) isolating the product from the liquid so removed.

2. The method of claim 1 comprising adding the substrate to the liquid prior to passing the substrate in the liquid through the reaction chamber.

3. The method of claim 1 comprising adding a reagent to the reactor, said reagent being capable of reacting with the substrate in the presence of the catalyst to produce the product and the by-product.

4. The method of claim 1 wherein the substrate is passed through the reaction chamber between about 0.5 MPa and about 10 MPa.

5. The method of claim 1 wherein the rate of flow in the reactor is sufficiently high that the by-product does not significantly decrease the activity of the catalyst.

6. The method of claim 1 wherein the step of removing at least a portion of the by-product comprises degassing the liquid, filtering or centrifuging the liquid, passing the liquid through a selective absorber, or comprises a combination of two or more of these.

7. The method of claim 1 comprising purifying the product.

8. The method of claim 1 wherein the step of removing at least a portion of the by-product comprises removing at least 80% thereof.

* * * * *